(12) United States Patent
Osawa et al.

(10) Patent No.: US 12,083,612 B2
(45) Date of Patent: Sep. 10, 2024

(54) ELECTRIC POWER WORK DEVICE

(71) Applicant: Yamabiko Corporation, Tokyo (JP)

(72) Inventors: Hisato Osawa, Tokyo (JP); Kenji Nakano, Tokyo (JP); Noriyuki Takeuchi, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 16/828,670

(22) Filed: Mar. 24, 2020

(65) Prior Publication Data

US 2020/0306847 A1 Oct. 1, 2020

(30) Foreign Application Priority Data

Mar. 26, 2019 (JP) .................................. 2019-058028

(51) Int. Cl.
  *B23D 57/02* (2006.01)
  *B25F 5/02* (2006.01)
  *B27B 17/00* (2006.01)
  *B27B 17/08* (2006.01)

(52) U.S. Cl.
  CPC .............. *B23D 57/023* (2013.01); *B25F 5/02* (2013.01); *B27B 17/0008* (2013.01); *B27B 17/08* (2013.01)

(58) Field of Classification Search
  CPC ... B23D 57/023; B27B 17/0008; B27B 17/08; B25F 5/02
  See application file for complete search history.

(56) References Cited

U.S. PATENT DOCUMENTS

| | | | |
|---|---|---|---|
| 8,757,288 B2 * | 6/2014 | Heinzelmann | B25F 5/02 173/217 |
| D738,175 S * | 9/2015 | Tinius | D8/65 |
| 9,764,399 B2 * | 9/2017 | Ukai | B23D 49/162 |
| 10,749,356 B2 * | 8/2020 | Takeda et al. | H02P 23/14 |
| 10,814,517 B2 * | 10/2020 | Suzuki et al. | B27B 17/0008 |
| 11,000,933 B2 * | 5/2021 | Ishikawa | B25F 5/008 |
| 2002/0129502 A1 * | 9/2002 | Durr | B27B 17/0008 30/381 |
| 2011/0162219 A1 * | 7/2011 | Okouchi | B27B 17/00 173/217 |
| 2011/0284257 A1 * | 11/2011 | Ogino | B25F 5/00 173/217 |

(Continued)

FOREIGN PATENT DOCUMENTS

| | | | |
|---|---|---|---|
| DE | 20 2013 103 656 U1 * | 9/2013 | B23D 57/023 |
| JP | 5530186 | 4/2014 | |

OTHER PUBLICATIONS

Extended European Search Report; EPO, Mar. 11, 2021.

*Primary Examiner* — Laura M Lee
(74) *Attorney, Agent, or Firm* — CRGO Global; Steven M. Greenberg

(57) ABSTRACT

Provided is an electric power work device, which is a chain saw, including: a body case; a cutting part protruding forward from the body case; a motor to drive the cutting part, and a battery. A top handle is provided at an upside with respect to the body case, and, a side handle is provided at a left side surface of the body case. The battery is detachably mounted in a battery part formed behind the top handle. Further, interference reduction part is formed behind the top handle to reduce interference with a palm holding the top handle or a wrist.

3 Claims, 6 Drawing Sheets

(56) References Cited

U.S. PATENT DOCUMENTS

| | | | |
|---|---|---|---|
| 2013/0164587 A1* | 6/2013 | Smith | H01M 50/247 |
| | | | 429/97 |
| 2013/0165027 A1* | 6/2013 | Sugita | B25F 5/02 |
| | | | 451/344 |
| 2014/0047722 A1* | 2/2014 | Onose | B25F 5/02 |
| | | | 30/383 |
| 2015/0375416 A1* | 12/2015 | Haneda | B27B 17/00 |
| | | | 30/383 |
| 2017/0202137 A1* | 7/2017 | Momiyama | B25F 5/02 |
| 2019/0111582 A1* | 4/2019 | Suzuki | B27B 17/08 |
| 2019/0217496 A1* | 7/2019 | Shibata et al. | B27B 17/02 |
| 2019/0240859 A1* | 8/2019 | Huber | B25F 5/02 |
| 2019/0262753 A1* | 8/2019 | Miura | B25F 5/008 |
| 2019/0381687 A1 | 12/2019 | Haneda et al. | |
| 2020/0406415 A1* | 12/2020 | Shimizu | A01D 34/416 |
| 2021/0046631 A1* | 2/2021 | Osawa | B25F 5/008 |
| 2021/0057686 A1* | 2/2021 | Qiao | H01M 10/052 |
| 2021/0237223 A1* | 8/2021 | Mok | H02K 7/145 |
| 2021/0252665 A1* | 8/2021 | Petsri | B24B 23/06 |
| 2022/0266361 A1* | 8/2022 | Lu | B25F 5/02 |

\* cited by examiner

ELECTRIC POWER WORK DEVICE

CROSS-REFERENCE TO RELATED APPLICATION

The present application claims the benefit of priority to Japanese Patent Application No. 2019-058028 filed on Mar. 26, 2019, the disclosures of all of which are hereby incorporated by reference in their entireties.

TECHNICAL FIELD

The present invention relates to an electric power work device.

BACKGROUND OF THE INVENTION

There is a conventional electric chain saw including a body case accommodating a motor therein, and a battery part, in which a battery is mounted, formed in a rear end part of the body case (see Japanese Patent No. 5530186, for example). Such a chain saw is allowed to have a larger battery than a case where a battery is accommodated in the body case.

The conventional chain saw described above includes a top handle formed on an upper part of the body case and a side handle on the left side surface of the body case. In this configuration, an operator holds the side handle with the left hand and holds the top handle with the right hand. In the conventional chain saw described above, the battery part and the battery greatly protrude rightward with respect to the top handle.

When the operator moves the chain saw slightly away from the operator to cut an object relatively far from the operator, it is preferable that the operator slightly extend the right arm from the top handle toward the rear of the body case. However, in the conventional chain saw described above, the palm or wrist of the right hand interferes with the battery part or a right side part of the battery so that the right hand opens rightward with respect to the top handle. Accordingly, there is a problem that it is difficult to cut the object relatively far from the operator. Thus, there is a risk that the battery part and battery of the conventional chain saw may interfere with a movement of the hand.

The present invention is intended to provide an electric power work device to solve the above-described problem, which reduces interference with a palm holding a top handle or a wrist during operation even when a large battery is mounted, and which improves handling during operation.

SUMMARY OF THE INVENTION

A first aspect of the present invention provides an electric power work device including a body case; a work tool protruding forward from a front side with respect to the body case; a motor to drive the work tool; and a battery to supply electric power to the motor. The motor is accommodated in the body case. A top handle is extended in a longitudinal direction at an upside with respect to the body case and a side handle is provided at one of a right side surface and a left side surface of the body case. The battery is detachably mounted in a battery part formed behind the top handle. Further, an interference reduction part is formed behind the top handle to reduce interference with a palm holding the top handle or a wrist. The interference reduction part is configured that an upper end part of a part of the body case, facing a front surface of the battery, is positioned lower than an upper end part of the top handle, at a corner between a front surface of the battery part and the other of the right side surface and the left side surface.

A second aspect of the present invention provides an electric power work device including a body case; a work tool protruding forward from a front side with respect to the body case; a motor to drive the work tool; and a battery to supply electric power to the motor. The motor is accommodated in the body case. A top handle is extended in a longitudinal direction at an upside with respect to the body case and a side handle is provided at one of a right side surface and a left side surface of the body case. The battery is detachably mounted in a battery part formed behind the top handle. Further, an interference reduction part is formed behind the top handle to reduce interference with a palm holding the top handle or a wrist. The interference reduction part is configured that a recess is formed on an upper part of the front surface of the battery with respect to the front surface of the battery, at a corner between the front surface of the battery and the other of the right side surface and the left side surface.

A third aspect of the present invention provides an electric power work device including a body case; a work tool protruding forward from a front side with respect to the body case; a motor to drive the work tool; and a battery to supply electric power to the motor. The motor is accommodated in the body case. A top handle is extended in a longitudinal direction at an upside with respect to the body case and a side handle is provided at one of a right side surface and a left side surface of the body case. The battery is detachably mounted in a battery part formed behind the top handle. Further, an interference reduction part is formed behind the top handle to reduce interference with a palm holding the top handle or a wrist. The interference reduction part is configured that an axis running through a center in a lateral direction of the battery part is positioned at a side, closer to the one of the right side surface and the left side surface, in the lateral direction with respect to an axis in a longitudinal direction running through a center in the lateral direction of a gripping part of the top handle.

A fourth aspect of the present invention provides an electric power work device including a body case; a work tool protruding forward from a front side with respect to the body case; a motor to drive the work tool; and a battery to supply electric power to the motor. The motor is accommodated in the body case. A top handle is extended in a longitudinal direction at an upside with respect to the body case and a side handle is provided at one of a right side surface and a left side surface of the body case. The battery is detachably mounted in a battery part formed behind the top handle. An interference reduction part is formed behind the top handle to reduce interference with a palm holding the top handle or a wrist. The interference reduction part is formed by the battery mounted in the battery part so as to have a front end part thereof positioned at a side closer to the one of the right side and the left side with respect to a rear end part thereof.

A fifth aspect of the present invention provides an electric power work device including a body case; a work tool protruding forward from a front side with respect to the body case; a motor to drive the work tool; and a battery to supply electric power to the motor. The motor is accommodated in the body case. A top handle is extended in a longitudinal direction at an upside with respect to the body case and a side handle is provided at one of a right side surface and a left side surface of the body case. The battery is detachably mounted in a battery part formed behind the top handle. An interference reduction part is formed behind the top handle to reduce interference with a palm holding the top handle or a wrist. The interference reduction part is formed by the battery mounted in the battery part so as to have an upper end part thereof positioned at a side closer to the one of the right side and the left side with respect to a rear end part thereof.

When the operator holds the electric power work device of the present invention, the operator holds the side handle with one of the right hand and the left hand, and holds the top handle with the other hand. The electric power work device according to the present invention includes the battery part and the battery shifted to a side closer to the one of the right side and the left side. Accordingly, the palm or wrist of the other hand of the operator can be moved to the one side. Therefore, the electric power work device of the present invention reduces interference with the palm holding the top handle or the wrist during operation, and a degree of freedom of a hand movement increases. As a result, the handling of the electric power work device and working efficiency are improved.

DETAILED DESCRIPTION OF THE PREFERRED EMBODIMENTS

A description will be given of examples of embodiments of the present invention in detail appropriately with reference to the drawings.

In the description of each embodiment, the same components will be denoted by the same reference symbols, and overlapping descriptions will be omitted.

In each embodiment, a configuration, in which the present invention is applied to a chain saw to cut a tree, a plate, or the like, will be described as an example. In the following description, a cutting part of the chain saw is on the front side, and a top handle thereof is on the upper side.

First Embodiment

Figure 1:
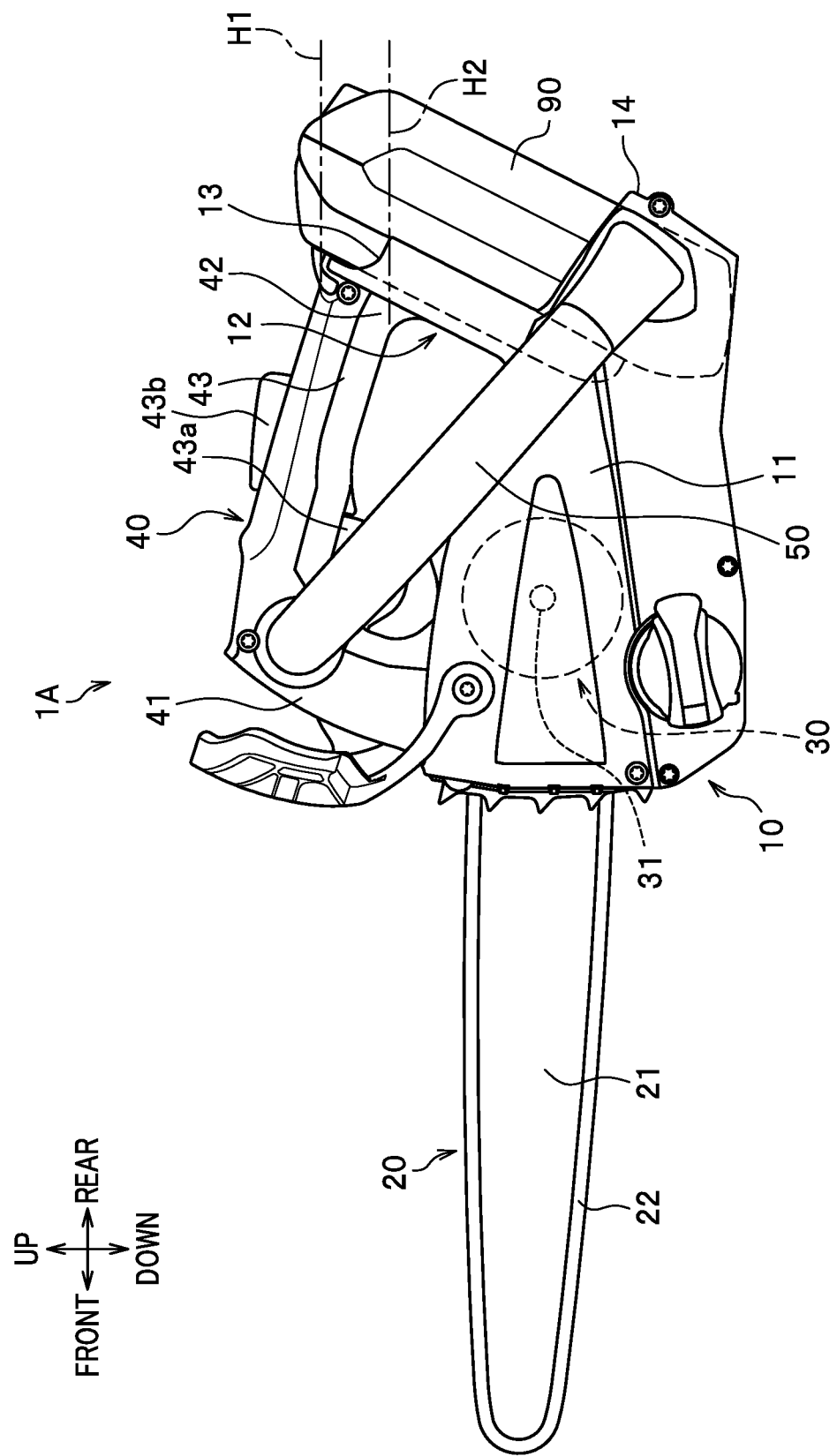
FIG. 1 is a side view of a chain saw according to a first embodiment of the present invention.

As shown in FIG. 1, a chain saw 1A of the first embodiment includes a body case 10, a cutting part 20 set to the body case 10, a motor 30 to drive the cutting part 20, and a battery 90. The cutting part 20 of the chain saw 1A is driven when the battery 90 mounted in the body case 10 supplies electric power to the motor 30.

Figure 3:
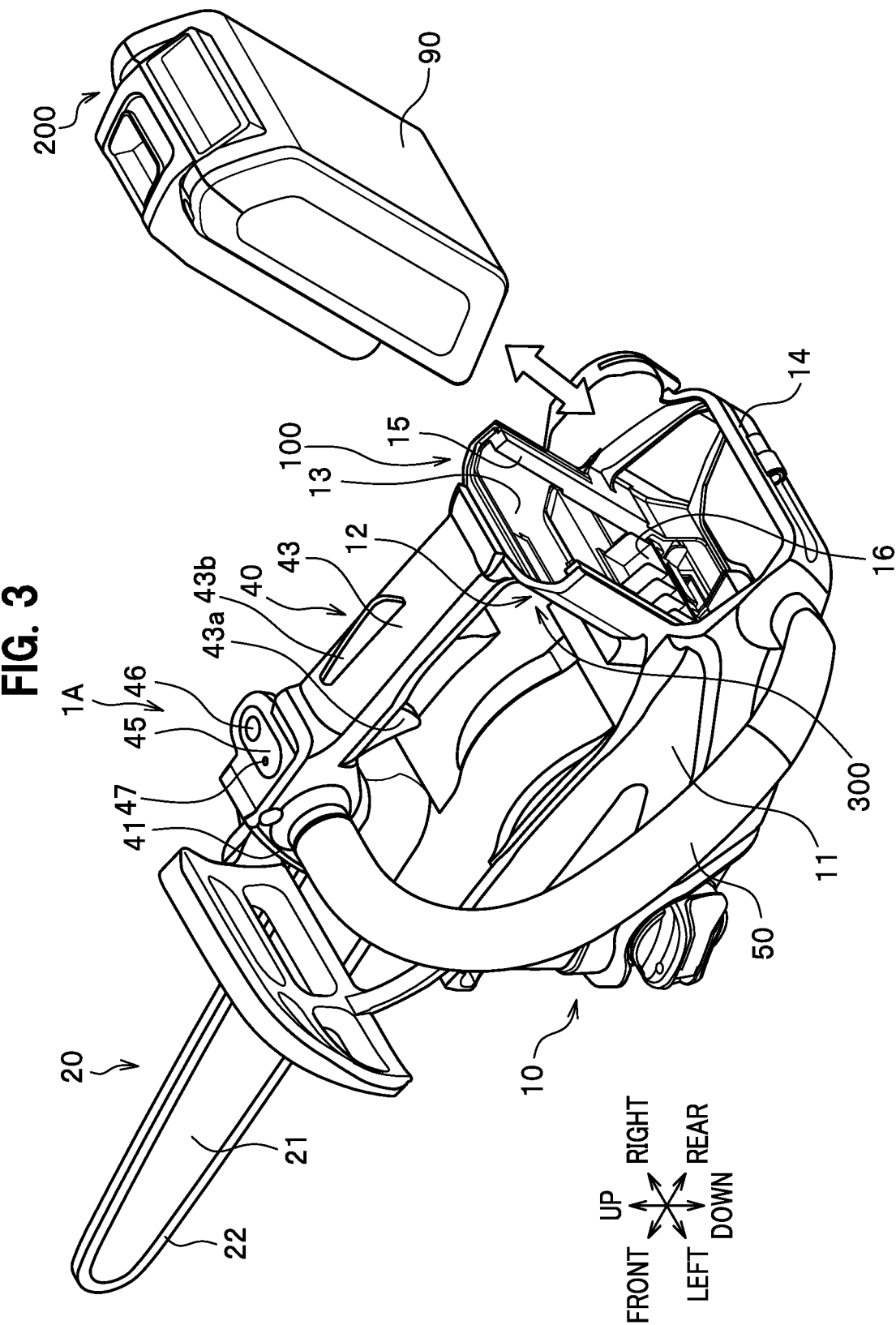
FIG. 3 is a perspective view of the chain saw, with a battery removed, according to the first embodiment of the present invention.

As shown in FIG. 3, the body case 10 includes a body part 11 which is a resin box, and a top handle 40 arranged on the upper side of the body part 11. Thus, the top handle 40 is arranged on an upper part of the body case 10. Further, the body case 10 includes, on the left side surface, a side handle 50.

Note that, in the first embodiment, the left side of the chain saw 1A indicates one of the right side and the left side in the appended claims, and the right side of the chain saw 1A indicates the other of the right side and the left side in the appended claims.

As shown in FIG. 1, the motor 30 is accommodated in a front part of the body part 11. The motor 30 is a popular electric motor. An output shaft 31 of the motor 30 extends in the lateral direction.

In addition to the motor 30, a control board (not shown) to control the driving of the motor 30 and a drive mechanism such as a driving gear (not shown) coupled to the output shaft 31 of the motor 30 are accommodated in the front part of the body part 11.

The top handle 40 is arranged to continue to the upper surface of the body part 11 and extends in the longitudinal direction above the body part 11.

The top handle 40 includes a front end part 41 protruding upward from a front end part of the upper surface of the body part 11. The top handle 40 includes a rear end part 42 coupled to an upper end part of a holding part 13 of the battery part 12 described below.

The top handle 40 includes a gripping part 43 extending in the longitudinal direction between the front end part 41 and the rear end part 42. The gripping part 43 is slightly inclined obliquely downward as extending from the front end part 41 toward the rear end part 42 of the top handle 40.

The gripping part 43 is a part to be gripped by the operator when the operator holds the chain saw 1A. The operator puts the hand into a space between the gripping part 43 and the upper surface of the body part 11.

The gripping part 43 includes a trigger lever 43a as operating part to increase or decrease the rotation speed of the saw chain 22 and a lock release lever 43b to unlock the trigger lever 43a, in a state where the operator grips the gripping part 43.

Figure 2:
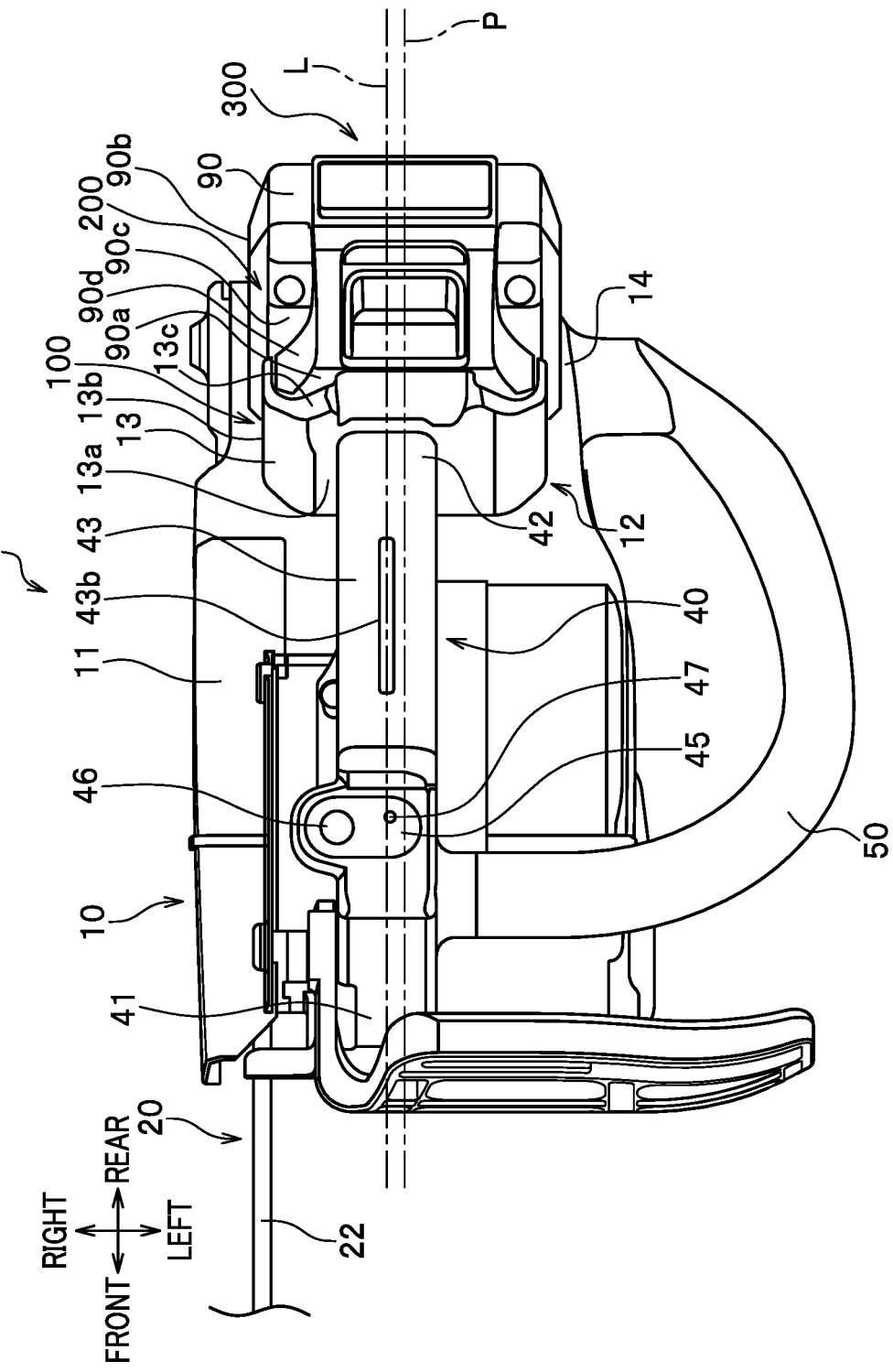
FIG. 2 is a plan view of the chain saw according to the first embodiment of the present invention.

As shown in FIG. 2, a thumb rest 45 is arranged on the upper surface of the front end part 41 of the top handle 40, on which a pad of the thumb of the right hand is placed when the operator grips the gripping part 43 with the right hand.

Further, a power switch 46 which is a push-button switch to switch so as to drive or stop the motor 30 (see FIG. 1) is arranged on the right side of the thumb rest 45.

Still further, the thumb rest 45 includes an indicator light 47 formed with a light emitting diode (LED) to indicate whether the power switch 46 is on or off.

As shown in FIG. 1, a battery part 12, in which a battery 90 is detachably mounted, is provided behind the top handle 40. The battery part 12 is formed in the rear end surface of the body part 11.

The battery part 12 includes the holding part 13 to hold the battery 90 and a battery case 14 to accommodate a lower part of the battery 90.

The holding part 13 is formed to have a rear end part of the body part 11 and a part in a plate shape extending upward from the rear end part of the body part 11. The holding part 13 is inclined such that a lower part is located forward with respect to an upper part. As shown in FIG. 3, the rear surface of the holding part 13 is an inclined surface which is gradually displaced forward as extending from the upper end to the lower end.

The holding part 13 includes, on the rear surface, an attachment/detachment mechanism 15 to attach or detach the battery 90. The attachment/detachment mechanism 15 includes guide members through which the battery 90 is fitted in the vertical direction and a support member (not shown) to support the battery 90 from below.

When the battery 90 is mounted in the holding part 13, the battery 90 is slid downward along the attachment/detachment mechanism 15 to mount the battery 90 in the holding part 13, as shown in FIG. 1.

The battery 90 is a popular battery, having a rechargeable battery such as a lithium ion storage battery accommodated in a rectangular parallelepiped case extending in the vertical direction, as shown in FIG. 3.

As shown in FIG. 1, the battery 90 is formed to have a height higher than that of the rear part of the body part 11. The battery 90 of the present embodiment is formed larger than a battery accommodatable in the body case 10. The battery 90 has sufficiently high power and charging capacity suitable for operation.

In a state where the battery 90 is mounted in the holding part 13, the battery 90 is arranged in the body case 10 such that the longitudinal direction of the battery 90 corresponds to the height direction of the body case 10. Further, the battery 90 mounted in the holding part 13 is formed larger than the rear part of the body part 11. The battery 90 is arranged in the vertical direction to stride across a central part in the height direction of the rear part of the body part 11.

Further, in a state where the battery 90 is mounted in the holding part 13, the upper end part of the battery 90 protrudes above a lower edge part H2 of the rear end part 42 of the top handle 40 and protrudes above an upper edge part H1 of the rear end part 42 of the top handle 40.

The holding part 13 includes an ejection mechanism (not shown) to be used for removing the battery 90 from the battery part 12. While the battery 90 is mounted in the holding part 13, a lever provided on an upper part of the battery 90 is operated to activate the ejection mechanism, to push up the battery 90.

Further, as shown in FIG. 3, the holding part 13 includes a metal connection terminal 16 on the rear surface thereof. The connection terminal 16 is electrically connected to the control board and the motor 30 (see FIG. 1). Once the connection terminal of the battery 90 is connected to the connection terminal 16 of the holding part 13, the battery 90 supplies the electric power to the control board and the motor 30.

As shown in FIG. 1, the battery case 14 is formed in a lower end part of the battery part 12. The battery case 14 is a cylindrical part to accommodate the lower part of the battery 90. The lower part of the battery 90 is inserted into the battery case 14.

As shown in FIG. 2, the body part 11 is set up, on a right side part thereof, with the cutting part 20 protruding forward. The cutting part 20 is a work tool for cutting operation and includes a guide bar 21 and a saw chain 22.

The guide bar 21 is a member in a plate shape extending in the longitudinal direction, and a rear end part of the guide bar 21 is attached to the right side part of the body part 11.

The saw chain 22 in an annular shape is wound around the outer periphery of the guide bar 21. A rear end part of the saw chain 22 is engaged with the drive gear coupled to the output shaft 31 of the motor 30.

When the motor 30 is driven to rotate the drive gear (not shown), the saw chain 22 rotates along the outer periphery of the guide bar 21.

As shown in FIG. 3, the side handle 50 extends in the longitudinal direction from a front part to a rear part on the left side surface of the body case 10. The side handle 50 is formed of a bent columnar member.

A front end part of the side handle 50 is attached to the left side surface of the front end part 41 of the top handle 40. A rear end part of the side handle 50 is positioned rearward and downward with respect to the output shaft 31 of the motor 30, and is attached to a left side wall of the battery case 14.

The side handle 50 is curved between the front end part and the rear end part thereof to bulge outward with respect to the left side surface of the body case 10 (see FIG. 2).

When an object to be cut, such as a tree or a plate, is cut with the chain saw 1A as shown in FIG. 1, the operator grips the gripping part 43 of the top handle 40 with the right hand, and grips the side handle 50 with the left hand to carry the chain saw 1A.

When the operator grips the gripping part 43 of the top handle 40 with the right hand, the lock release lever 43b is pushed down with the palm, and the lock of the trigger lever 43a is released. Further, the operator places the pad of the thumb of the right hand, with which the gripping part 43 is gripped, on the thumb rest 45 in FIG. 2 so that the operator can stably hold the top handle 40.

Next, the operator shifts the thumb of the right hand to the right side to push the power switch 46 so as to be in an on-state. The pad of the thumb of the right hand is then returned to the thumb rest 45, and when the trigger lever 43a is pulled up with the index finger of the right hand, as shown in FIG. 1, the motor 30 is driven to rotate the saw chain 22. As a result, the object to be cut can be cut with the saw chain 22.

Figure 4:
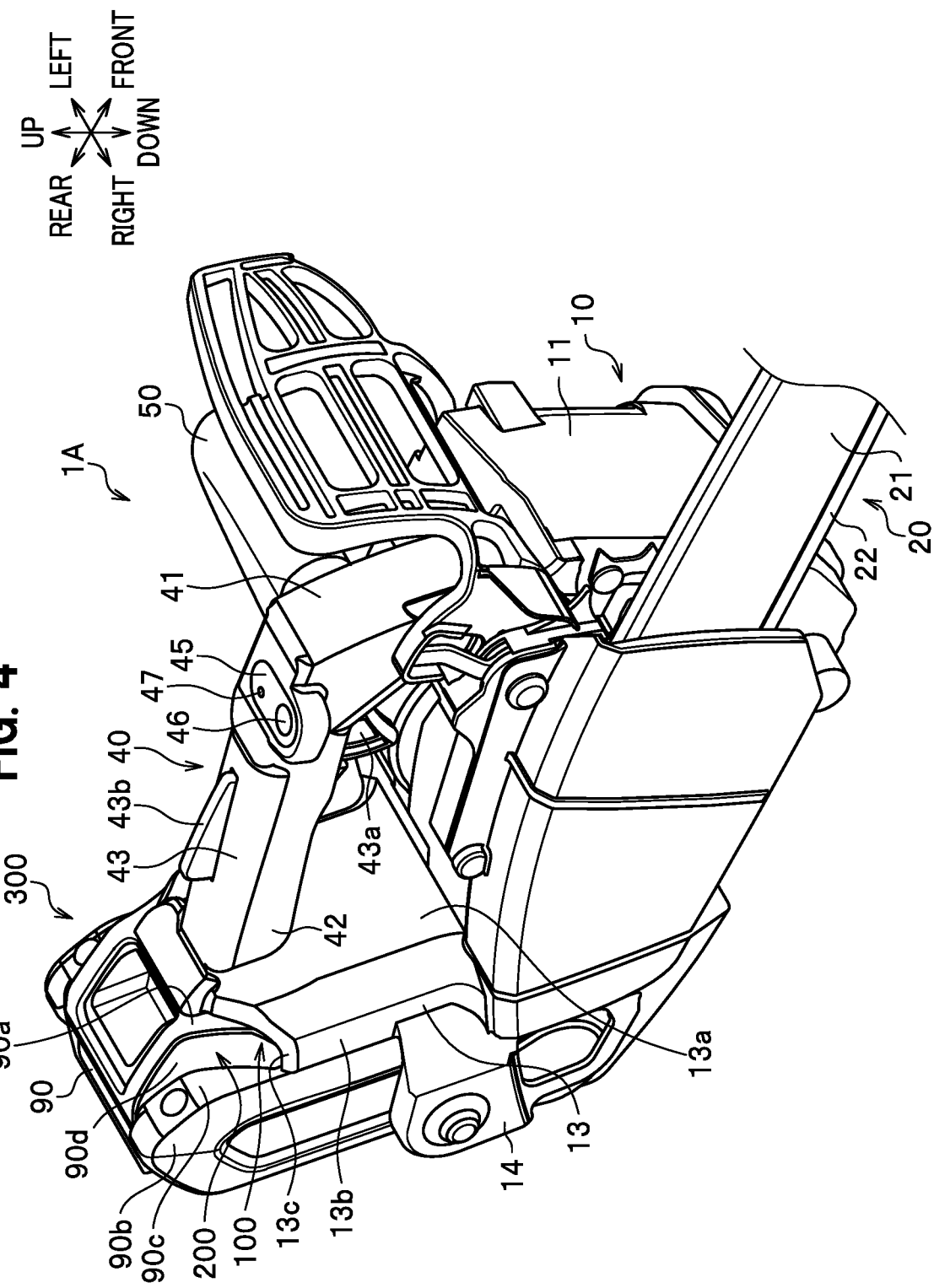
FIG. 4 is a perspective view of the chain saw according to the first embodiment of the present invention, as viewed from the front upper right.

As shown in FIG. 4, the chain saw 1A of the first embodiment includes, behind the top handle 40, a first interference reduction part 100, a second interference reduction part 200, and a third interference reduction part 300 to reduce interference with the palm holding the top handle 40 or the wrist.

The first interference reduction part 100 is formed such that an upper end part of a part facing a front surface 90a of the battery 90 is positioned lower than an upper edge part of the rear end part 42 of the top handle 40 at a corner between the front surface 13a and a right side surface 13b of the holding part 13 of the battery part 12. An upper end part of the corner between the front surface 13a and right side surface 13b of the holding part 13 is formed with an inclined surface 13c gradually reduced in height from an inner side to an outer side in the lateral direction.

The second interference reduction part 200 is formed such that a recess 90c is formed, with respect to the front surface 90a of the battery 90, on an upper part of the front surface 90a of the battery 90 at a corner between the front surface 90a and a right side surface 90b of the battery 90.

An upper end part of the corner between the front surface 90a and right side surface 90b of the battery 90 is formed with an inclined surface 90d gradually reduced in height from an inner side to an outer side in the lateral direction. The inclined surface 90d of the battery 90 is formed to continue to a rear part of the inclined surface 13c of the holding part 13.

As shown in FIG. 2, the third interference reduction part 300 is positioned such that an axis P running through the centers in the lateral direction of the battery part 12 and the battery 90 is positioned leftward with respect to an axis L in the longitudinal direction running through the center in the lateral direction of the gripping part 43 of the top handle 40.

The battery part 12 and the battery 90 greatly protrude more leftward than rightward with respect to the gripping part 43 of the top handle 40. That is, an amount of protrusion of the battery part 12 and the battery 90 rightward with respect to the gripping part 43 of the top handle 40 is reduced as compared with a case where the axis P running through the centers in the lateral direction of the battery part 12 and the battery 90 is positioned on the axis line L.

When the operator grips the top handle 40 with the right hand and moves the chain saw 1A slightly far from the operator to cut an object relatively far from the operator, or, raises the chain saw 1A slightly upward from the operator to cut an object relatively upward from the operator, the operator slightly extends the right arm from the top handle 40 toward the rear of the body case 10.

In this case, the palm gripping the top handle 40 or wrist of the right hand is placed on the inclined surface 13c formed on the upper end part of the corner at the front right of the holding part 13 of the battery part 12. Thus, the palm or wrist of the right hand is positioned leftward with respect to the right side surface 13b of the holding part 13.

Further, the palm holding the top handle 40 or the wrist of the right hand is placed in the recess 90c formed in the upper part of the corner at the front right of the battery 90. Thus, the palm or wrist of the right hand is positioned leftward with respect to the right side surface 90b of the battery 90.

Further, the chain saw 1A has the axis P, running through the centers in the lateral direction of the battery part 12 and the battery 90, which is positioned leftward with respect to the center in the lateral direction of the gripping part 43 of the top handle 40. Thus, the palm or wrist of the right hand can be shifted leftward.

As shown in FIG. 2, the chain saw 1A (electric power work device) described above includes the battery part 12 and the battery 90 shifted leftward. Therefore, when the operator moves the chain saw 1A relatively far away from the operator, or, when the operator raises the chain saw 1A relatively upward, the palm or wrist of the right hand is easily moved leftward. As a result, the operator easily extends the right arm rearward from the body case 10.

Thus, with the chain saw 1A, the interference between the palm gripping the top handle 40 or the wrist, and the battery part 12 as well as the battery 90 is reduced during operation so that the degree of freedom of the hand movement is increased.

Further, as shown in FIG. 1, the chain saw 1A accommodates the motor 30 in the front part of the body case 10 and the battery 90 increased in size can be mounted in the rear part so that the weight balance between the front and rear of the chain saw 1A is increased.

Accordingly, with the chain saw 1A of the first embodiment, the handling during operation and working efficiency are improved.

In the chain saw 1A of the present embodiment, the battery 90 is mounted in the battery part 12 such that the longitudinal direction of the battery 90 corresponds to the height direction of the body case 10. In this configuration, the center of gravity of the battery 90 is shifted frontward even if the battery 90 is increased in size in the height direction, as compared with a case where the longitudinal direction of the battery 90 is oriented in the lateral direction. Therefore, the handling of the chain saw 1 having the battery 90 increased in size, during operation, is improved, and the chain saw 1A is reduced in size.

In the chain saw 1A of the first embodiment, when the battery 90 is mounted in the holding part 13, the upper end part of the battery 90 protrudes above the lower edge part H2 of the rear end part 42 of the top handle 40, and protrudes above the upper edge part H1 of the rear end part 42 of the top handle 40. Setting the height of the battery 90 in this manner allows for increasing the power and the charging capacity of the battery 90.

The chain saw 1A of the first embodiment includes the battery part 12 inclined such that the upper part thereof is positioned posterior to the lower part thereof, to make the battery 90 inclined so as to be away rearward from the gripping part 43. In this configuration, even if the battery 90 is extended in the vertical direction, the upper part of the battery 90 does not hinder the operator when the operator grips the gripping part 43. Therefore, the battery 90 can be increased in size without the operability of the chain saw 1A being reduced, and the battery 90 is inclined as described above so that the lower part of the battery 90 is positioned more anterior than the upper part. Accordingly, the center of gravity having the top handle 40 as an axis can be shifted frontward.

Though the first embodiment of the present invention has been described above, the present invention is not limited thereto and can be appropriately modified within the scope of the present invention.

As shown in FIG. 2, the chain saw 1A according to the first embodiment includes the three parts, which are the first interference reduction part 100, the second interference reduction part 200, and the third interference reduction part 300. However, the chain saw 1A may include at least one of the first interference reduction part 100, the second interference reduction part 200, and the third interference reduction part 300.

The chain saw 1A of the first embodiment is configured such that the top handle 40 is to be gripped by the right hand. When the top handle 40 is configured to be gripped by the left hand, for example, the first interference reduction part 100, the second interference reduction part 200, and the third interference reduction part 300 may be formed on the opposite side in the lateral direction with respect to the top handle 40.

Though the chain saw 1A applied with the present invention has been described in the present embodiment, an electric power work device applicable with the present invention is not limited to a chain saw, and the present invention is applicable to various kinds of electric power work devices such as a brush cutter, a hedge trimmer, and a blower.

Second Embodiment

Next, a description will be given of a chain saw 1B according to a second embodiment of the present invention.

The chain saw 1B of the second embodiment has substantially the same configuration as the chain saw 1A of the first embodiment (see FIG. 2), and is different in that a fourth interference reduction part 400 is included therein.

Figure 5:
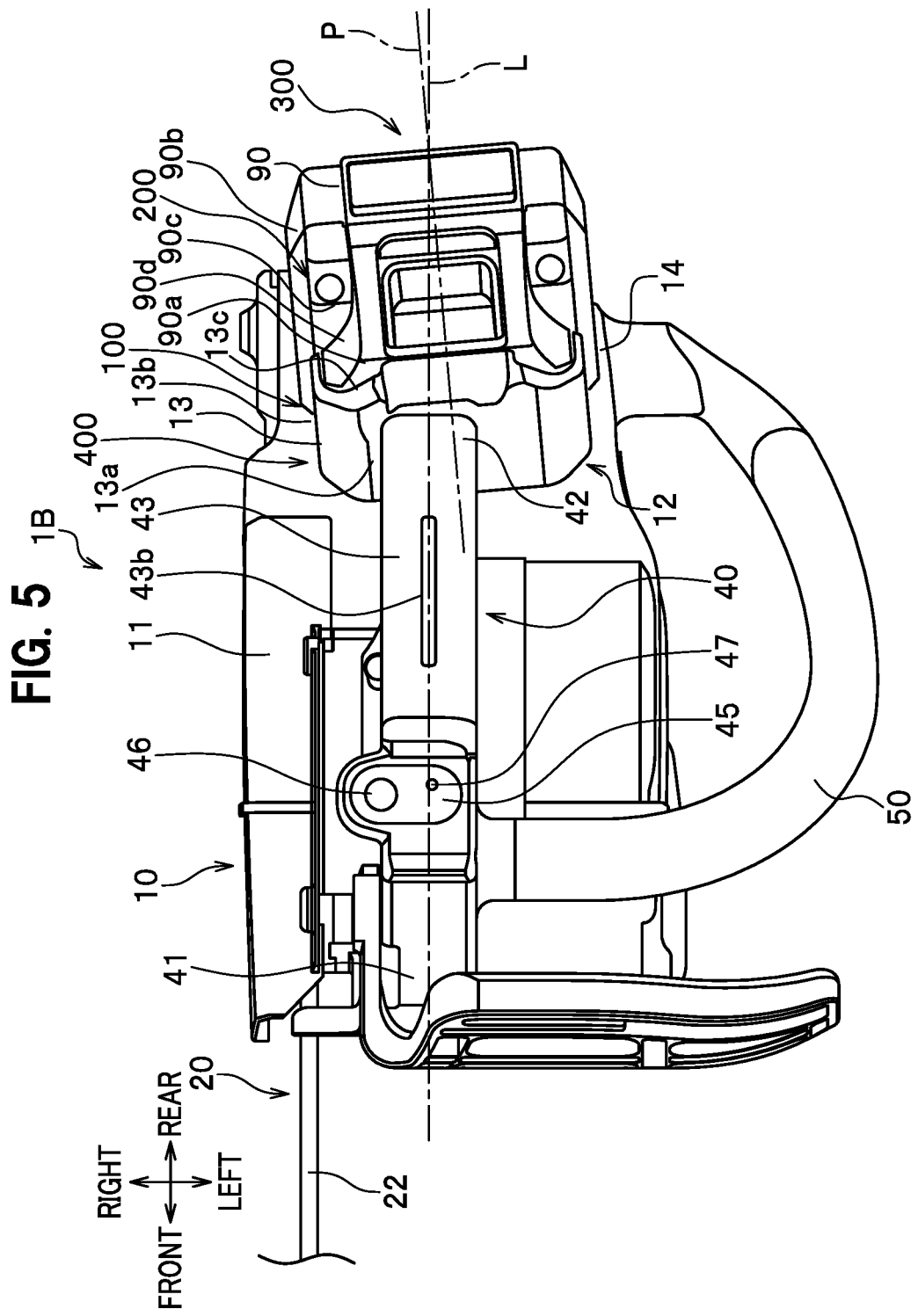
FIG. 5 is a plan view of a chain saw according to a second embodiment of the present invention.

As shown in FIG. 5, the fourth interference reduction part 400 is formed by the battery 90 mounted in the battery part 12 so as to have the center in the lateral direction of the front end part of the battery 90 is positioned leftward with respect to the center in the lateral direction of the rear end part of the battery 90.

The holding part 13 of the battery part 12 in the second embodiment greatly protrudes more leftward than rightward with respect to the center in the lateral direction of the gripping part 43 of the top handle 40.

In the chain saw 1B of the second embodiment, the battery part 12 and the front part of the battery 90 are shifted leftward with respect to the rear part thereof, so that the palm holding the top handle 40 or wrist of the right hand is easily shifted leftward.

Thus, with the chain saw 1B of the second embodiment, the interference with the palm holding the top handle 40 or the wrist is reduced during operation, and the degree of freedom of the hand movement is increased. Therefore, the handling during operation and working efficiency are improved.

As described above, though the second embodiment of the present invention has been described, the present invention is not limited thereto and can be appropriately modified within the scope of the present invention, similarly to the first embodiment.

The chain saw 1B of the second embodiment may include, in addition to the fourth interference reduction part 400, at least one of the first interference reduction part 100, the second interference reduction part 200, and the third interference reduction part 300. Further, the chain saw 1B of the second embodiment may include only the fourth interference reduction part 400.

When the chain saw 1B of the second embodiment is configured to include the top handle 40 so as to be gripped by the left hand, the fourth interference reduction part 400 may be formed on the opposite side in the lateral direction with respect to the top handle 40.

Third Embodiment

Next, a description will be given of a chain saw 1C according to a third embodiment of the present invention.

The chain saw 1C according to the third embodiment has substantially the same configuration as the chain saw 1A according to the first embodiment (see FIG. 2), and is different in that a fifth interference reduction part 500 is included therein.

Figure 6:
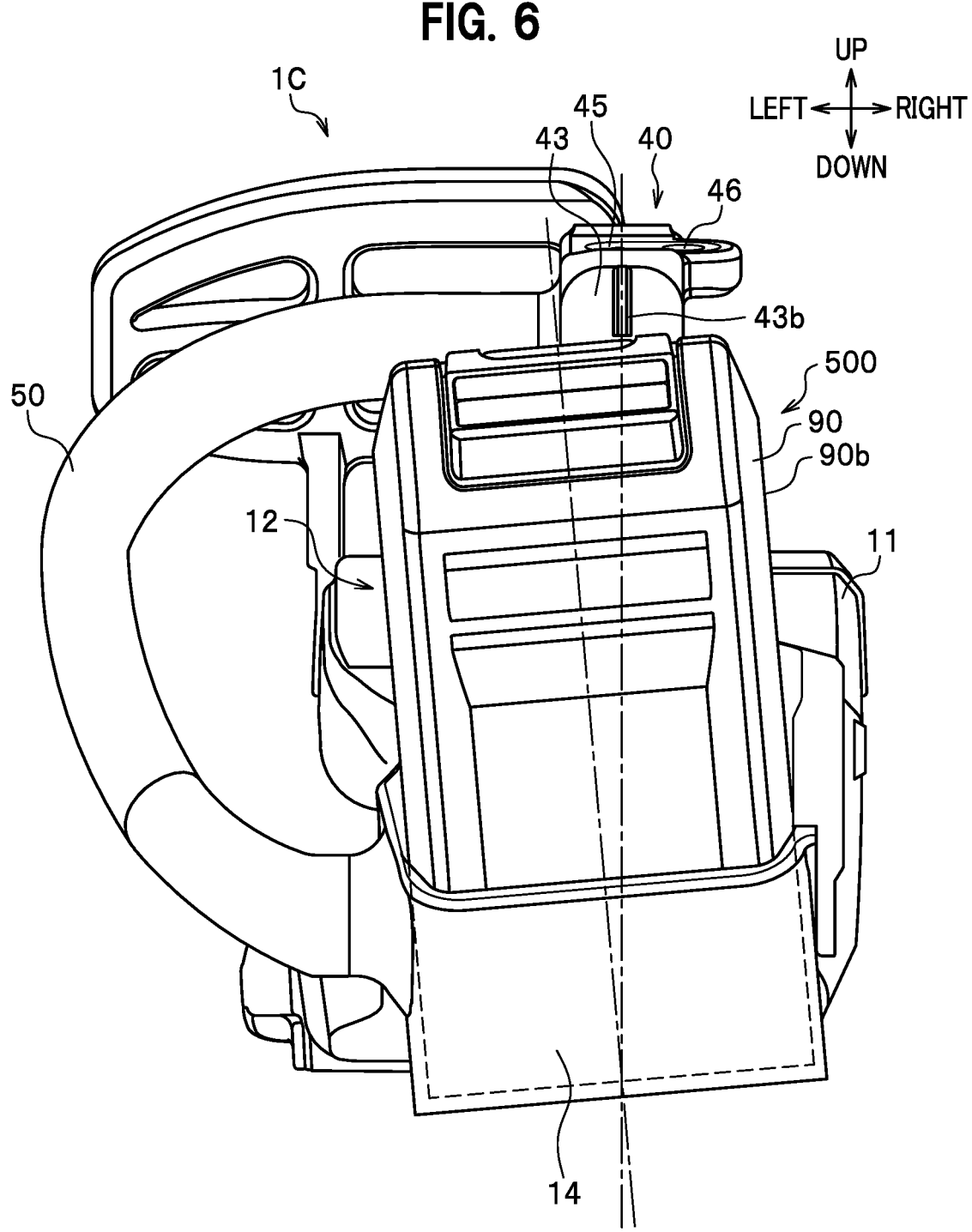
FIG. 6 is a rear view of a chain saw according to a third embodiment of the present invention.

As shown in FIG. 6, the fifth interference reduction part 500 is configured by the battery 90 mounted in the battery part 12 so as to have the center in the lateral direction of the upper end part of the battery 90 positioned leftward with respect to the center in the lateral direction of the rear end part of the battery 90.

The chain saw 1C of the third embodiment includes the holding part 13 (see FIG. 4) of the battery part 12 inclined such that an upper end part thereof is positioned more leftward with respect to the lower end part thereof.

In the chain saw 1C of the third embodiment, the upper end part of the battery 90 is shifted more leftward with respect to the lower end part thereof, so that the palm holding the top handle 40 or the wrist of the right hand can be easily shifted leftward.

Thus, with the chain saw 1C of the third embodiment, the interference with the palm holding the top handle 40 or the wrist is reduced during operation, and the degree of freedom of the hand movement is increased. Therefore, the handling during operation and working efficiency are improved.

As described above, though the third embodiment of the present invention has been described, the present invention is not limited thereto and can be appropriately modified within the scope of the present invention, similarly to the first embodiment.

The chain saw 1C of the third embodiment may include, in addition to the fifth interference reduction part 500, at least one of the first interference reduction part 100 (see FIG. 2), the second interference reduction part 200 (see FIG. 2), the third interference reduction part 300 (See FIG. 2), and the fourth interference reduction part 400 (see FIG. 5).

Further, the chain saw 1C of the third embodiment may include only the fifth interference reduction part 500.

When the top handle 40 in the chain saw 1C of the third embodiment is configured to be gripped by the left hand, the fifth interference reduction part 500 is formed on the opposite side in the lateral direction of the top handle 40.

EXPLANATION OF SYMBOLS

1A: chain saw (first embodiment), 1B: chain saw (second embodiment), 1C: chain saw (third embodiment), 10: body case, 11: body part, 12: battery part, 13: holding part, 13c: inclined surface, 14: battery case, 20: cutting part, 21: guide bar, 22: saw chain, 30: motor, 40: top handle, 43: gripping part, 45: thumb rest, 46: power switch, 47: indicator light, 50: side handle, 90: battery, 90c: recess, 90d: inclined surface, 100: first interference reduction part, 200: second interference reduction part, 300: third interference reduction part, 400: fourth interference reduction part, and 500: fifth interference reduction part.

What is claimed is:

1. An electric power work device comprising:
   a body case;
   a work tool protruding forward from a front side of the body case;
   a motor operably connected to the work tool to drive the work tool; and
   a single battery operably connected to the motor to supply electric power to the motor,
   wherein
   a battery part is formed behind a top handle and has a holding part in which the single battery is detachably mounted;
   the motor is accommodated in the body case,
   the top handle is mounted to the body case and is extended in a longitudinal direction at an upside with respect to the body case,
   a side handle is mounted at one end to the top handle and at the other end of the battery part, at one of a right side surface and a left side surface of the battery part,
   an upper end part of the single battery protrudes above an upper edge part of a rear end part of the top handle when the single battery is mounted in the holding part,
   a first interference reduction part, a second interference reduction part, and a third interference reduction part are formed behind the top handle in a longitudinal direction of the electric power work device to reduce interference with a palm or wrist holding the top handle when an operator extends an arm rearward,
   the first interference reduction part is formed by an upper end part of the holding part of the battery part and configured such that the upper end part of the holding part of the battery part, facing a front surface of the single battery, is positioned lower than an upper end part of the top handle, at a corner between a front surface of the battery part and the other of the right side surface and the left side surface of the battery part where the side handle is mounted,
   the second interference reduction part is formed by the single battery having a recess and an inclined surface at a corner between the front surface of the single battery and the other of the right side surface and the left side surface of the battery part where the side handle is mounted,
   an axis (P) of the third interference reduction part running through a center in the lateral direction of the battery part is positioned at a side, closer to the one of the right side surface and the left side surface of the battery part where the side handle is mounted, with respect to an axis (L) in the longitudinal direction running through a center in the lateral direction of a gripping part of the top handle, the holding part comprising an attachment/detachment mechanism of parallel arms coupled to one another by a transverse edge of the holding part, the attachment/detachment mechanism securing the battery to the battery part.

2. The electric power work device as claimed in claim 1, wherein the battery part is inclined such that an upper part thereof is positioned posterior to a lower part thereof.

3. The electric power work device as claimed in claim 1, wherein an upper end part of the single battery is positioned above an upper end edge of a rear end part of the top handle.

* * * * *